US009479264B2

(12) United States Patent
Cheng et al.

(10) Patent No.: US 9,479,264 B2
(45) Date of Patent: Oct. 25, 2016

(54) AVALANCHE PHOTODIODE BIAS CONTROL IN PASSIVE OPTICAL NETWORKS

(71) Applicant: Futurewei Technologies, Inc., Plano, TX (US)

(72) Inventors: Ning Cheng, Santa Clara, CA (US); Guo Wei, Shenzhen (CN); Zhenxing Liao, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 175 days.

(21) Appl. No.: 13/930,301

(22) Filed: Jun. 28, 2013

(65) Prior Publication Data

US 2014/0003808 A1 Jan. 2, 2014

Related U.S. Application Data

(60) Provisional application No. 61/666,397, filed on Jun. 29, 2012.

(51) Int. Cl.
*H04B 10/60* (2013.01)
*H01S 3/04* (2006.01)
*H04B 10/06* (2006.01)
*H04B 10/69* (2013.01)

(52) U.S. Cl.
CPC ........... *H04B 10/60* (2013.01); *H04B 10/6911* (2013.01)

(58) Field of Classification Search
CPC .............. H04B 10/60; H04B 10/6911; H04B 10/6931; H04B 10/66
USPC .................................... 398/38, 25, 9
See application file for complete search history.

(56) References Cited

U.S. PATENT DOCUMENTS

| 7,639,952 | B2 | 12/2009 | Nelson | |
|---|---|---|---|---|
| 2003/0210917 | A1* | 11/2003 | Stewart et al. | ............... 398/209 |
| 2005/0129415 | A1* | 6/2005 | Tang | .................. H04B 10/6911 398/208 |

(Continued)

FOREIGN PATENT DOCUMENTS

| CN | 101394230 A | 3/2009 |
|---|---|---|
| CN | 101871813 A | 10/2010 |

OTHER PUBLICATIONS

"A Burst-Mode APD-ROSA Using Reset Signal With Less Than 100 ns Response for 1G/10G-EPON Dual-Rate Optical Transceivers" Journal of Lightwave Technology Jul. 15, 2011.*
Foreign Communication From A Counterpart Application, PCT Application No. PCT/CN2013/078499, International Search Report dated Oct. 17, 2013, 6 pages.
Foreign Communication From A Counterpart Application, PCT Application No. PCT/CN2013/078499, Written Opinion dated Oct. 17, 2013, 4 pages.

(Continued)

*Primary Examiner* — Oommen Jacob
(74) *Attorney, Agent, or Firm* — Conley Rose, P.C.; Grant Rodolph; Jonathan K. Polk

(57) ABSTRACT

An apparatus comprising a receiver optical subassembly (ROSA) configured to receive an optical signal, wherein the ROSA comprises an optical-electrical (O/E) converter configured to convert the optical signal into an electrical signal, and a processor coupled to the ROSA and configured to calibrate an O/E converter bias, wherein calibrating the O/E converter bias comprises reading an initial O/E converter dark current measurement, adjusting the O/E converter bias with a voltage step, reading an adjusted O/E converter dark current measurement after the voltage step adjustment, and monitoring an O/E converter dark current change rate by subtracting the initial O/E converter dark current measurement from the adjusted O/E converter dark current measurement.

20 Claims, 9 Drawing Sheets

(56) References Cited

U.S. PATENT DOCUMENTS

| | | | |
|---|---|---|---|
| 2006/0157679 A1* | 7/2006 | Scheuerlein | G11C 13/0004 257/2 |
| 2008/0017785 A1* | 1/2008 | Byren | H04B 10/6911 250/214 R |
| 2010/0111305 A1* | 5/2010 | Yuan et al. | 380/256 |
| 2011/0248175 A1* | 10/2011 | Frach et al. | 250/363.03 |
| 2011/0292381 A1* | 12/2011 | Murayama | G01J 1/44 356/218 |
| 2013/0294766 A1* | 11/2013 | Cai | H04B 10/07953 398/26 |
| 2014/0003808 A1* | 1/2014 | Cheng et al. | 398/38 |

OTHER PUBLICATIONS

Tsuyoshi, I., et al., "A Burst-Mode APD-ROSA Using Reset Signal With Less Than 100 ns Response for 1G/10G-EPON Dual-Rate Optical Transceivers," Journal of Lightwave Technology, vol. 29, No. 14, Jul. 15, 2011, pp. 2089-2101.

Zhu, et al., "ACT: Audio Conference Tool Over Named Data Networking," ICN'11 Proceedings of the ACM SIGCOMM Workshop on Information-Centric Networking, Aug. 19, 2011, Toronto, Canada, pp. 68-73.

Wei, et al., "Experience with Collaborative Conferencing Applications in Named-Data Networks," Consumer Communications and Networking Conference (CCNC), IEEE, 2013, 6 pages.

* cited by examiner

AVALANCHE PHOTODIODE BIAS CONTROL IN PASSIVE OPTICAL NETWORKS

CROSS-REFERENCE TO RELATED APPLICATIONS

The present application claims priority to U.S. Provisional Patent Application 61/666,397, filed Jun. 29, 2012 by Ning Cheng, et. al., and entitled "Methods for Avalanche Photodiode Bias Control in Passive Optical Networks", which is incorporated herein by reference as if reproduced in its entire.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multipoint (P2MP) network comprised of an optical line terminal (OLT) at the central office, an optical distribution network (ODN), and a plurality of optical network units (ONUs) at the customer premises. PONs may also comprise remote nodes (RNs) located between the OLTs and the ONUs, for example, at the end of a road where multiple users reside. In recent years, time division multiplexing (TDM) PONs, such as Gigabit PONS (GPONs) and Ethernet PONs (EPONs), have been deployed worldwide for multimedia applications. In TDM PONs, the total capacity is shared among multiple users using a time division multiple access (TDMA) scheme, so the average bandwidth for each user is limited to well below 100 megabits per second (Mbps) for GPONs and EPONs.

As user bandwidth demands are ever increasing, ten gigabits per second (Gbps) (10 G) PONs (e.g., ten gigabit per second (Gbps) GPON (XGPONs) and 10 G EPONs) have also been standardized for next generation optical access. In TDM PON, a power splitter is used to distribute and/or collect signal to/from the ONUs. As the power splitter introduces significant loss, the performance of TDM PON is limited by the power budget. The number of users who can be served by TDM PON is typically limited to 64 and the transmission distance is limited to 20 kilometers (km). PON operators are interested in increasing the splitting ratio and a longer reach so that more users may be served and larger areas may be covered. Hence, there is a need to improve the power budget of TDM PON systems.

While the downstream power budget in TDM PON may be improved relatively easily, the upstream power budget may be more limited. For instance, the OLT may increase downstream transmit power by employing a higher power transmitter or an optical amplifier, whereas ONUs typically employ low cost lasers with low power. In addition, there is a lower loss in the downstream direction at the outside plant fiber since the downstream wavelength is in the S-band (1490 nanometers (nm) for GPON and EPON) or the L-band (1577 nm for XG-PON and 10 G EPON), whereas the upstream wavelength is in the O-band (1310 nm for GPON and EPON, 1270 nm for XG-PON and 10 G EPON). Further, the burst mode transmission used in the upstream direction introduces additional power penalty compared to the continuous mode transmissions in the downstream direction. Since ONUs are typically cost limited, it may not be practical to increase the ONUs transmit power. Consequently, there is a need in the art for methods and systems to improve the OLT receiver sensitivity in TDM PON systems.

SUMMARY

In one embodiment, the disclosure includes apparatus comprising a receiver optical subassembly (ROSA) configured to receive an optical signal, wherein the ROSA comprises an optical-electrical (O/E) converter configured to convert the optical signal into an electrical signal, and a processor coupled to the ROSA and configured to calibrate an O/E converter bias, wherein calibrating the O/E converter bias comprises reading an initial O/E converter dark current measurement, adjusting the O/E converter bias with a voltage step, reading an adjusted O/E converter dark current measurement after the voltage step adjustment, and monitoring an O/E converter dark current change rate by subtracting the initial O/E converter dark current measurement from the adjusted O/E converter dark current measurement.

In another embodiment, the disclosure includes a computer program product comprising computer executable instructions stored on a non-transitory computer readable medium such that when executed by a processor cause an optical component to set an avalanche photodiode (APD) bias to an initial voltage, wherein the initial voltage is smaller than a breakdown voltage of the APD, calibrate the APD bias, wherein calibrating the APD bias comprises reading an initial APD dark current measurement, increasing the APD bias with voltage steps, wherein the voltage steps are about 0.1 Volt (V), reading an updated APD dark current measurement after each voltage step, monitoring an initial APD dark current change rate by subtracting the initial APD dark current measurement from the updated APD dark current measurement, repeating the APD bias increment to generate an updated APD dark current change rate until the updated APD dark current change rate is about twice the initial APD dark current change rate, and setting an operating voltage for the APD bias by subtracting a predefined voltage from the APD bias, wherein the operating voltage is an APD bias while receiving data, and wherein the predefined voltage is about 0.5V or about 1V, wait for a triggering event, initiate a new calibration, and repeat the wait for the triggering event and the initiation of the new calibration.

In another embodiment, the disclosure includes an APD bias calibration method comprising biasing an APD to an initial voltage, wherein the initial voltage is smaller than a breakdown voltage of the APD, measuring an initial APD dark current, increasing an APD bias with voltage steps, wherein the voltage steps are about 0.1V, measuring an adjusted APD dark current after each voltage step, monitoring an initial APD dark current change rate by subtracting the initial APD dark current measurement from the adjusted APD dark current measurement, repeating the APD bias increment to generate an updated APD dark current change rate until the updated APD dark current change rate is about twice the initial APD dark current change rate, and setting an operating voltage for the APD bias by subtracting a predefined voltage from the APD bias, wherein the operating voltage is an APD bias while receiving data and wherein the predefined voltage is about 0.5V or about 1V.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
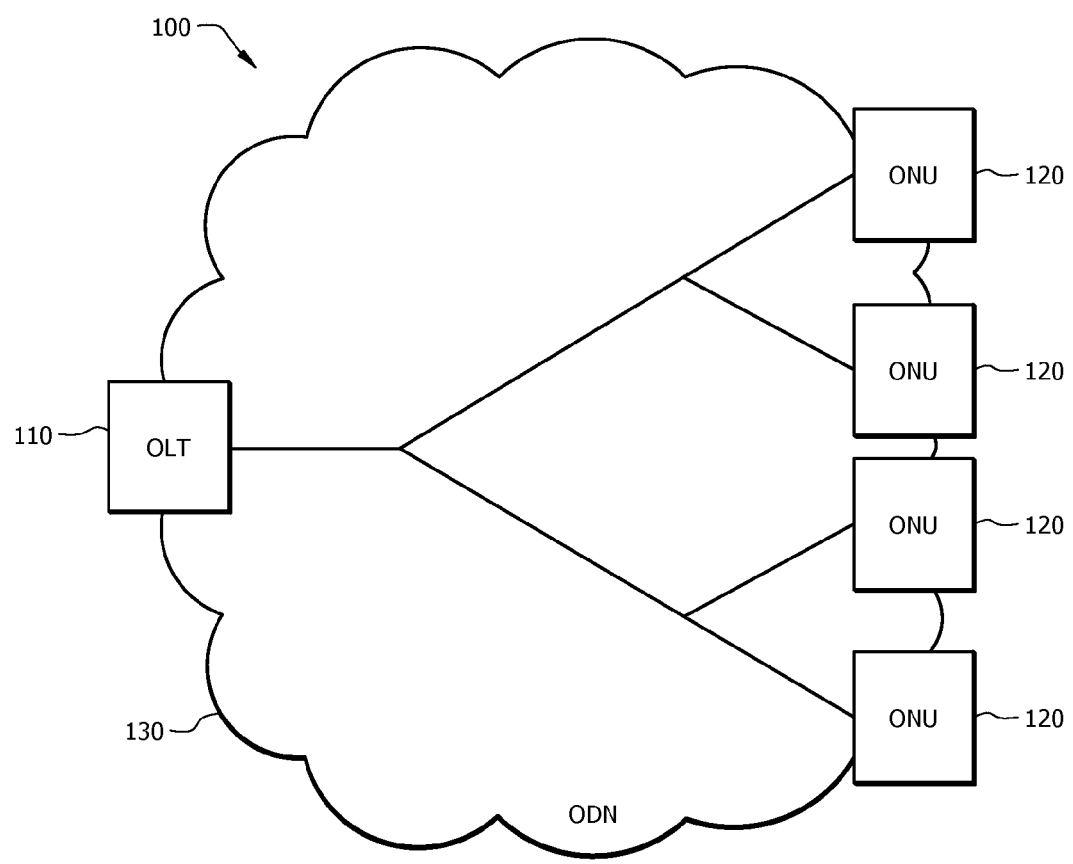
FIG. 1 is a schematic diagram of an embodiment of a PON system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently, many TDM PON systems use an APD receiver at the OLT. The ROSA with APD is commonly used without automatic temperature control in order to reduce cost. An OLT housed at the central office may experience temperature variations ranging from about 0 degrees Celsius (° C.) to about 70° C. As such, the OLT receiver has to operate and achieve the required sensitivity (e.g. about −28 decibel-milliwatts (dBm) for Class B+ power budget) over a wide temperature range. The effect of operating temperature and APD bias voltage on APD performance is well known. As a result, suppliers for PON transceiver modules typically implement some measures of automatic APD bias control in order to meet the performance and temperature requirements. One approach is to test each OLT transceiver by calibrating the APD bias voltage for optimal receiver performance at different temperatures, recording the optimal APD bias for each temperature in a table, and storing the APD bias table in the OLT transceiver memory. During normal operation, the OLT transceiver may set the APD bias according to the pre-stored table based on the operating temperature. This approach may be used for small volume production to produce OLT transceivers with good performance. However, this approach may be costly and time consuming for large volume production. More recently, many major suppliers for PON transceivers have adopted a compromised approach where a large sample of APD receivers is tested for sensitivity at different temperatures and the optimal APD bias is recorded for large volume production. For example, one PON transceiver supplier calibrates APD bias for optimal receiver performance at three temperature settings, about 0° C., about 35° C., and about 70° C. At each temperature setting, an optimal APD bias is calculated by averaging over all the optimal APD bias measured from the APD receiver samples. Then, a table of APD bias for temperatures in the range of about 0° C. to about 70° C. is generated by curve fitting over the three averaged measurements. This APD bias table is then stored in all the PON transceivers during large volume production instead of calibrating each APD receiver individually. This compromised approach may provide good performance for majority of the APD receivers at a lower cost. However, since APD characteristics may vary greatly from chip to chip due to process variations, the APD receiver performance may also vary greatly. As such, optimal performance may not be guaranteed for all APD receivers. For example, a GPON OLT transceiver with precise APD bias control over temperatures may achieve about −31 dBm or lower sensitivity at about 1.25 Gbps, but many suppliers may only guarantee about −28 dBm sensitivity.

Disclosed herein is a method, apparatus, and system for controlling APD bias in a PON transceiver. The disclosed embodiments monitor APD dark current with a transimpedance amplifier (TIA) power supply shut off while varying APD bias. In an embodiment, the optimal APD bias may be determined by increasing the APD bias at small voltage steps until the APD dark current change rate exceeds a certain threshold. In another embodiment, the APD bias may be recalibrated during normal operation when temperature change exceeds a certain threshold or at fixed time intervals. During normal operation, the OLT requests all ONUs in the PON to stop transmitting for a period of time so that APD dark current may be measured and APD bias may be set. In another embodiment, the APD bias may be adjusted based on upstream bit error rate from the Forward Error Correction (FEC). The disclosed methods control APD bias automatically to provide OLT transceivers with optimal sensitivity while reducing OLT transceiver costs and complexity.

FIG. 1 illustrates one embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as an XGPON, which may have a downstream bandwidth of about ten Gbps and an upstream bandwidth of at least about 2.5 Gbps. Alternatively, the PON 100 may be any Ethernet based network, such as an EPON defined by the Institute of Electrical and Electronics Engineers (IEEE) 802.3ah standard, a 10 Gigabit EPON as defined by the IEEE 802.3av standard, an asynchronous transfer mode PON (APON), a broadband PON (BPON) defined by International Telecommunication Union (ITU-T) G.983 standard, a GPON defined by the ITU-T G.984 standard, or a wavelength division multiplexed (WDM) PON (WPON). All of these standards are incorporated herein by reference.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to/from a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

Figure 2:
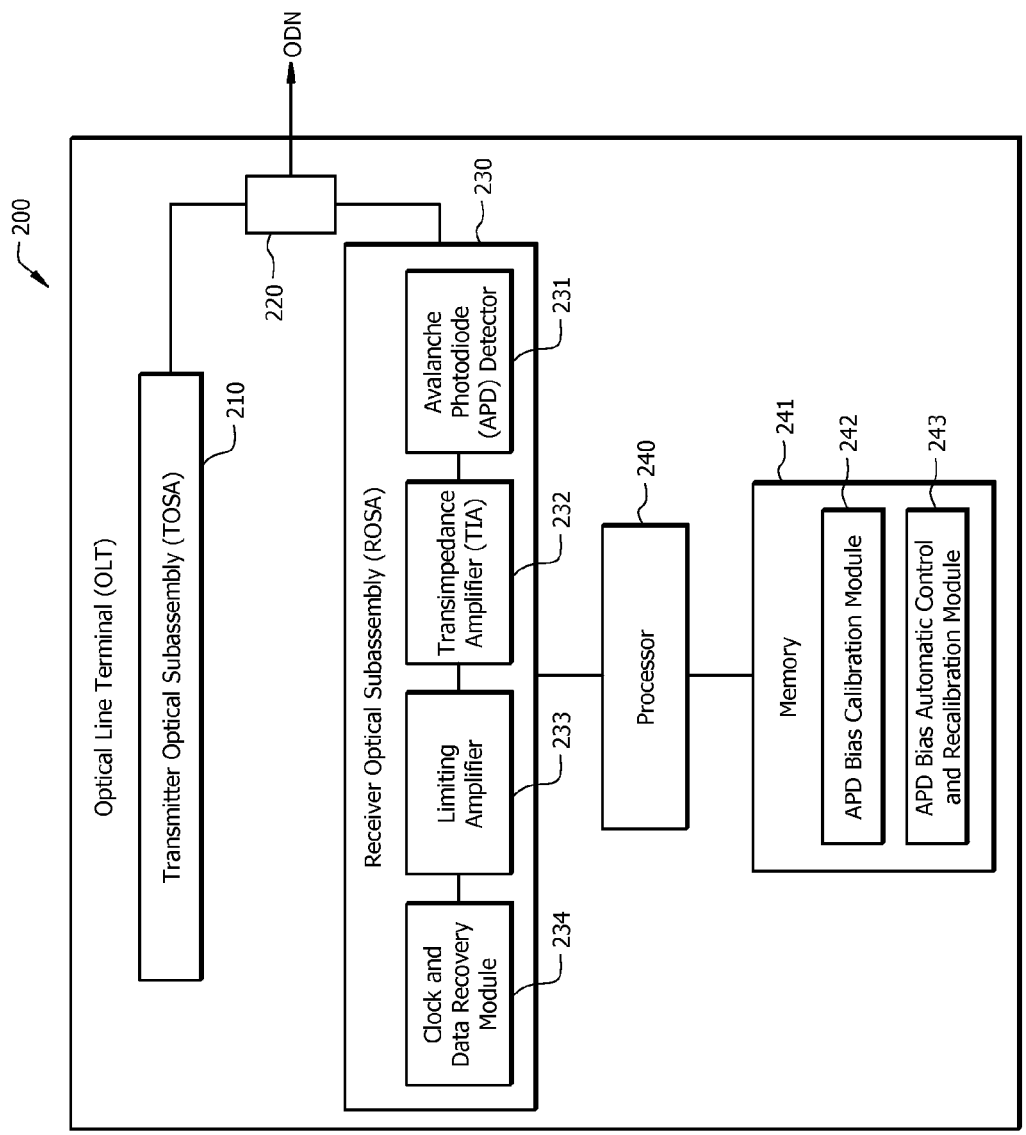
FIG. 2 is a schematic diagram of an embodiment of an OLT.

A more detailed view of the OLT 110 of FIG. 1 is shown in FIG. 2 as OLT 200. In FIG. 2, the OLT 200 may comprise a transmitter optical subassembly (TOSA) 210 coupled to a ROSA 230 via a coupler 220. The coupler 220 may be an optical splitter, or an optical circulator, or a diplexer, or a wavelength division multiplexing (WDM) filter. The ROSA 230 may comprise an APD detector 231 where APD is an optical-electrical converter (O/E) that may convert optical signal to an electrical signal, a TIA 232 that may control the gain, a limiting amplifier 233 that may provide additional gain, and a clock and data recovery module 234 that may decode the data stream. Notably, the configuration of modules 231 to 234 is depicted herein for explanatory purposes, and those of ordinary skill in the art will recognize that modules 231 to 234 may be arranged in various alternative configurations that may include additional intermediate processing components and/or omit/substitute/rearrange one or more of the modules 231 to 234. The modules 231 to 234 may interact with one another, as well as with other components within the OLT 200, to convert an upstream optical signal into an electrical signal. A processor 240 may be coupled to the ROSA 230 and be configured to monitor, analyze and control signals from the ROSA 230. The system as shown in FIG. 2 may also be an ONU or other optical component. The processor 240 may comprise one or more multi-core processors and/or memory modules 241, which may function as data stores, buffers, etc. Processor 240 may be implemented as a general processor or may be part of one or more application specific integrated circuits (ASICs) and/or digital signal processors (DSPs). The memory modules 241 may be used to house the instructions for carrying out the system and methods described herein. For example, the memory module 241 may comprise an APD bias calibration module 242 with instructions for implementing the APD bias calibration method 500 discussed below and an APD bias automatic control and recalibration module 243 with instructions for implementing the APD bias automatic control method 600 or 800 discussed below, and the APD bias recalibration method 700 or 900 discussed below, which may all be executed by the processor 240. Alternately, the APD bias calibration module 242 and the APD bias automatic control and recalibration module 243 may be implemented directly on the processor 240. The APD bias calibration module 242 and the APD bias automatic control and recalibration module 243 may be implemented using software, hardware, or both. The memory module 241 may comprise a cache for temporarily storing content, e.g., a Random Access Memory (RAM). Additionally, the memory module 241 may comprise a long-term storage for storing content relatively longer, e.g., a Read Only Memory (ROM). For instance, the cache and the long-term storage may include dynamic random-access memories (DRAMs), solid-state drives (SSDs), hard disks, or combinations thereof.

Figure 3:
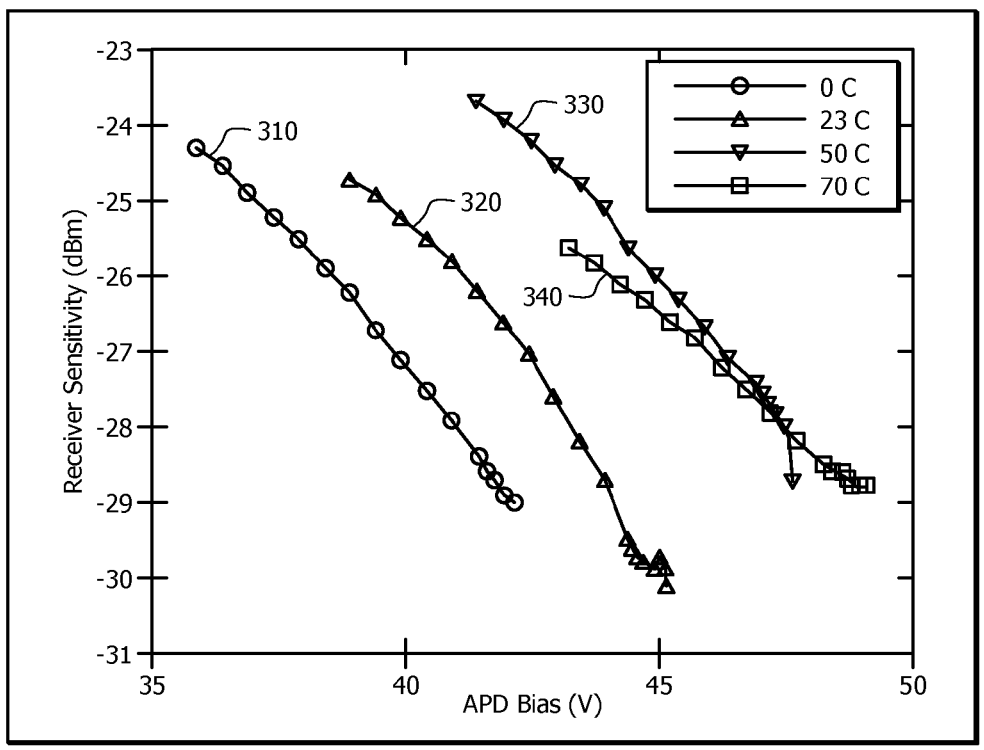
FIG. 3 is a graph of an embodiment of typical sensitivities of APD receiver optical subassembly (ROSA) with varying APD bias and temperatures.

FIG. 3 is a graph 300 of typical APD ROSA sensitivities. The x-axis represents APD bias voltage in Volts and the y-axis represents receiver sensitivity in dBm. Sensitivities are determined by measuring the minimum input signal power required at the receiver to achieve a certain bit error rate that is substantially low. The sensitivities for a 2.5 Gbps burst mode are measured for a number of APD ROSAs from different suppliers with varying APD bias at various temperatures. In graph 300, the curves 310, 320, 330, and 340 are plots of sensitivities as a function of APD bias at temperatures of about 0° C., about 23° C., about 50° C., and about 70° C., respectively. As shown in graph 300, the APD receiver sensitivity is strongly dependent on the APD bias for a given temperature. The optimal APD bias also varies as temperature varies.

Figure 4:
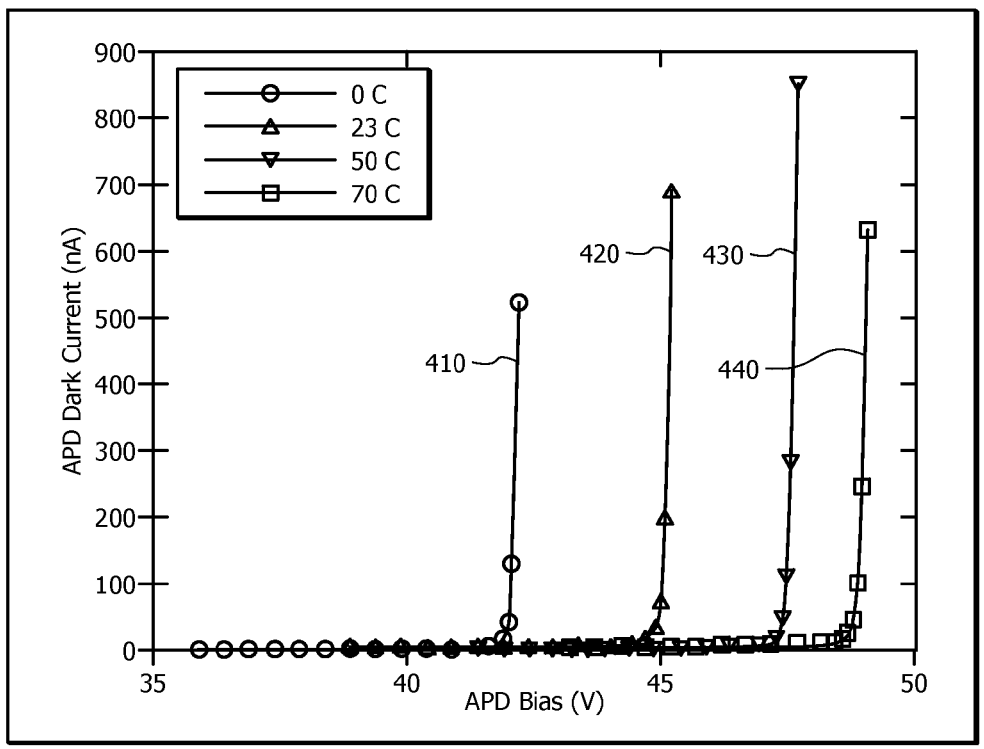
FIG. 4 is a graph of an embodiment of APD dark current with varying APD bias and temperatures.

FIG. 4 is a graph 400 of APD dark current. The x-axis represents APD bias voltage in Volts and the y-axis represents APD dark current in nanoampere (nA). APD dark current may be monitored by using a current mirror in an APD bias circuit. In graph 400, the curves 410, 420, 430, and 440 are plots of APD dark current as a function of APD bias at temperatures of about 0° C., about 23° C., about 50° C., and about 70° C., respectively. As shown in graph 400, the APD dark current is also highly dependent on the APD bias for a given temperature. By comparing graphs 300 and 400, a high correlation between APD receiver sensitivity and APD dark current is observed. That is, when the APD bias is close to its breakdown voltage, the APD dark current increases significantly, while the APD receiver sensitivity is close to optimal. Based on this observation, the disclosed method controls the APD bias for optimal receiver sensitivity by monitoring the APD dark current.

Figure 5:
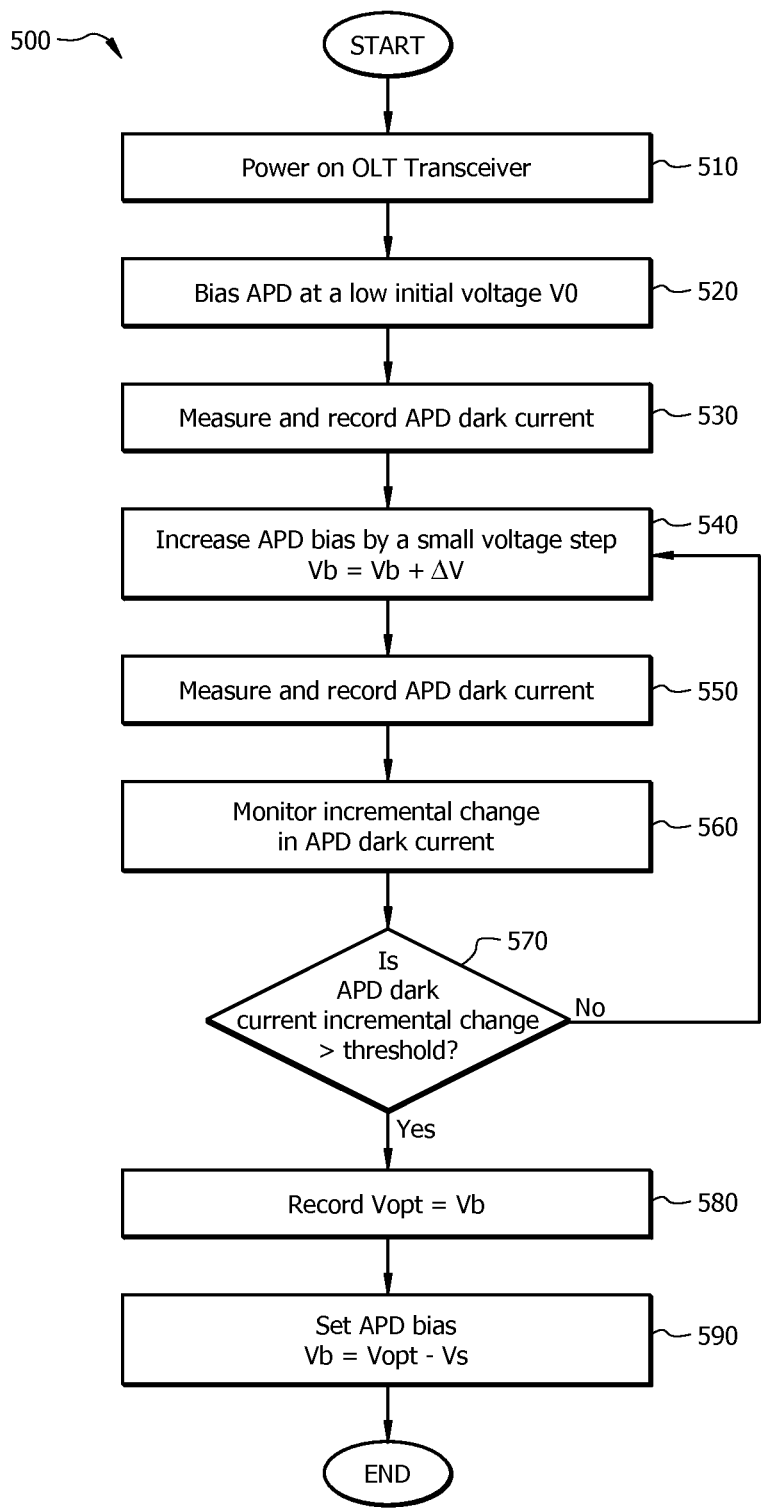
FIG. 5 is a flowchart of an embodiment of an APD bias calibration method by monitoring APD dark current.

FIG. 5 is a flowchart of an APD bias calibration method 500, which may be implemented on an OLT 110. While method 500 is discussed with reference to an OLT, persons of ordinary skill in the art will appreciate that it could be applied to an ONU or other optical component. The method 500 may begin at 510 where an OLT transceiver is first powered on. At step 520, the APD may be biased at an initial voltage V0 that is much smaller than its breakdown voltage. There may be no ONUs registered to the OLT at this time. As such, the APD dark current may be measured and APD bias may be set. At step 530, the initial APD dark current may be measured and recorded in memory. Next, at step 540, the APD bias may be increased by a small voltage step $\Delta V$, wherein the small voltage step $\Delta V$ is about 0.1 Volt (V). At step 550, the APD dark current may be measured and recorded in memory after the small voltage increment. At step 560, the incremental change in dark current may be monitored, where the incremental change may be computed by subtracting an APD dark current measurement in a previous step from the APD dark current measurement in the current step. As shown in the loop of steps 540 to 570, this may be continued until the APD dark current incremental change in the current step is about twice of the APD dark current incremental change in the previous step. In step 580, the last APD bias setting may be recorded as $V_{opt}$, where $V_{opt}$ is the optimum voltage that may provide close to optimal receiver sensitivity. However, since the optimum voltage may be too close to the breakdown voltage, variations in temperature may bring the APD into its breakdown region. Hence, at step 590, the APD bias voltage may be set to a slightly lower voltage as $V_{opt}$-Vs, where the safety voltage step Vs may be about 0.5V or about 1V. This APD bias voltage may provide the APD receiver with good performance (within about 1 decibel (dB) of the optimum sensitivity).

The method 500 may achieve good sensitivity, but only for a given temperature in some embodiments. As discussed earlier, the OLT transceiver may be required to operate in a wide temperature range (i.e. about 0° C. to about 70° C.) during normal operation. One option may be to add a temperature controller to stabilize the operating temperature at the APD ROSA. However, this may increase cost and power consumption. Alternatively, a temperature sensor may be used to track the varying temperatures and automatically control the APD bias accordingly.

Figure 6:
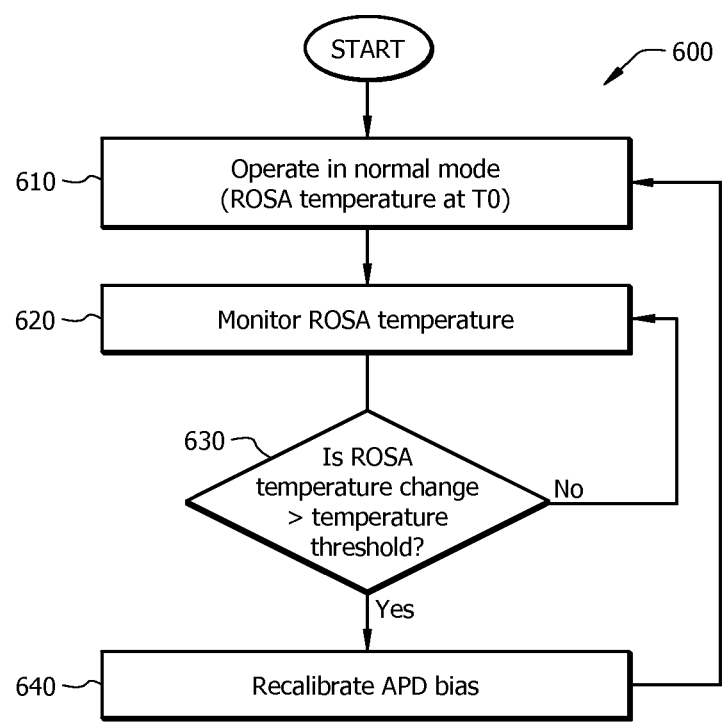
FIG. 6 is a flowchart of an embodiment of an automatic APD bias control method based on APD ROSA temperature change.

FIG. 6 is a flowchart of an automatic APD bias control method 600, which may be implemented on an OLT 110. While method 600 is discussed with reference to an OLT, persons of ordinary skill in the art will appreciate that it could be applied to an ONU or other optical component. The method 600 may begin at step 610 where the OLT transceiver may have completed the APD bias calibration as discussed in method 500 and started normal operation. At this time, the APD ROSA temperature is at T0. At step 620, the operating temperature at the APD ROSA may be monitored. As shown in the loop of steps 620 and 630, this may be continued until the temperature change at the APD ROSA exceeds a predefined threshold (e.g. ±about 5° C.). Then, at step 640, the APD bias may be recalibrated using method 700 as discussed in more detail below with respect to FIG. 7. The loop with steps 610 to 640 may be repeated during normal operation to recalibrate the APD bias for optimal sensitivity by monitoring temperature change at the APD ROSA.

Figure 7:
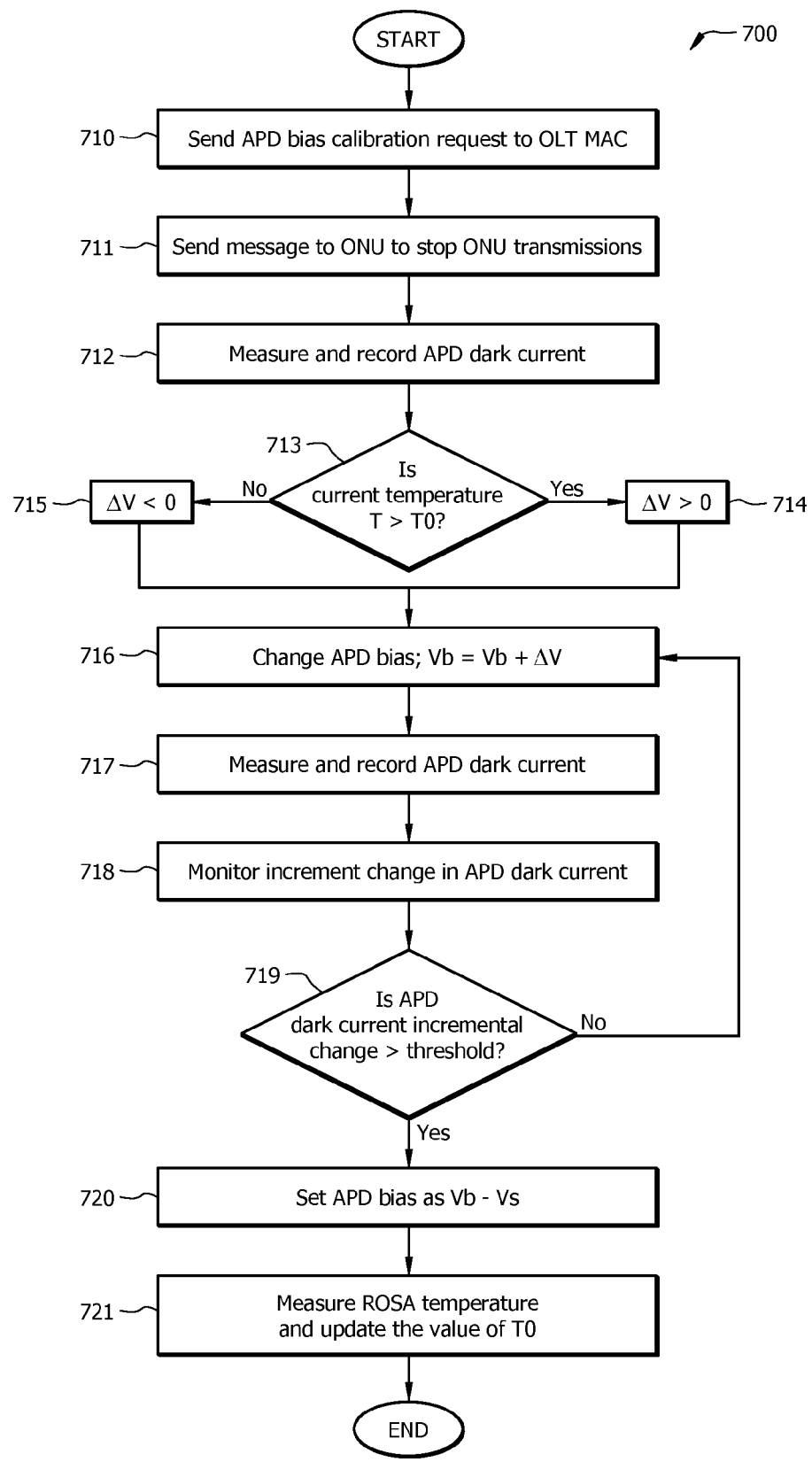
FIG. 7 is a flowchart of an embodiment of an APD bias recalibration method by monitoring APD dark current.

FIG. 7 is a flowchart of an APD recalibration method 700 for normal operation, which may be implemented on an OLT 110. While method 700 is discussed with reference to an OLT, persons of ordinary skill in the art will appreciate that it could be applied to an ONU or other optical component. At step 710, an APD calibration request may be sent to the OLT media access control (MAC) logic. The APD bias may be recalibrated by monitoring the APD dark current, similar to the method 500, with the exception that ONUs upstream transmissions may now be present during normal operation. As such, the OLT MAC may request all ONUs to stop upstream transmission for a period of time as shown in step 711. There are multiple ways to stop ONUs upstream transmissions. For instance, the OLT MAC may send a Physical Layer Operations and Maintenance (PLOAM) message to request all ONUs to stop upstream transmission for a period of time. The OLT MAC may also assign all ONUs with zero upstream bandwidth in a Bandwidth Mapping (BWMAP) message. Alternatively, the OLT MAC may open a long registration window that is longer than the round trip delay, where the initial time period up to the round trip delay may be used for new ONU registration and the remaining period may be used for APD bias control.

At step 712, the APD dark current may be measured when there is no upstream transmission present. The APD dark current measurement may also be recorded in memory. At step 713, the current temperature may be checked and compared to a temperature T0, where T0 is the operating temperature measured at the end of the last recalibration. At step 714, the small voltage step $\Delta V$ may be set as an increment (e.g. $\Delta V$=about +0.1V) if the current temperature is higher. Otherwise at step 715, the small voltage step $\Delta V$ may be set as a decrement (e.g. $\Delta V$=about −0.1V). The remaining recalibration steps 716 to 720 are similar to the APD bias calibration steps as discussed in steps 540 to 590 of method 500. At step 716, the APD bias may be adjusted by the small voltage step $\Delta V$. At step 717, the APD dark current may be measured and recorded in memory after the small voltage adjustment. At step 718, the incremental change in dark current may be monitored. As shown in the loop of steps 716 to 719, this may be continued until the APD dark current incremental change in the current step is about twice of the APD dark current incremental change in the previous step. At step 720, the APD bias may be backed off by the safety voltage Vs (e.g. Vs=about 0.5V or about 1V). At step 721, the ROSA temperature may be measured and the value of T0 may be updated with the current operating temperature.

As shown in the method 700, all ONUs in the PON are to stop upstream transmission during APD bias recalibration. This may lead to reduced bandwidth efficiency in upstream transmission. However, the impact should be minimal since the temperature varies slowly at the central office and recalibration should occur very infrequently with either method 600 or method 800 discussed below.

Figure 8:
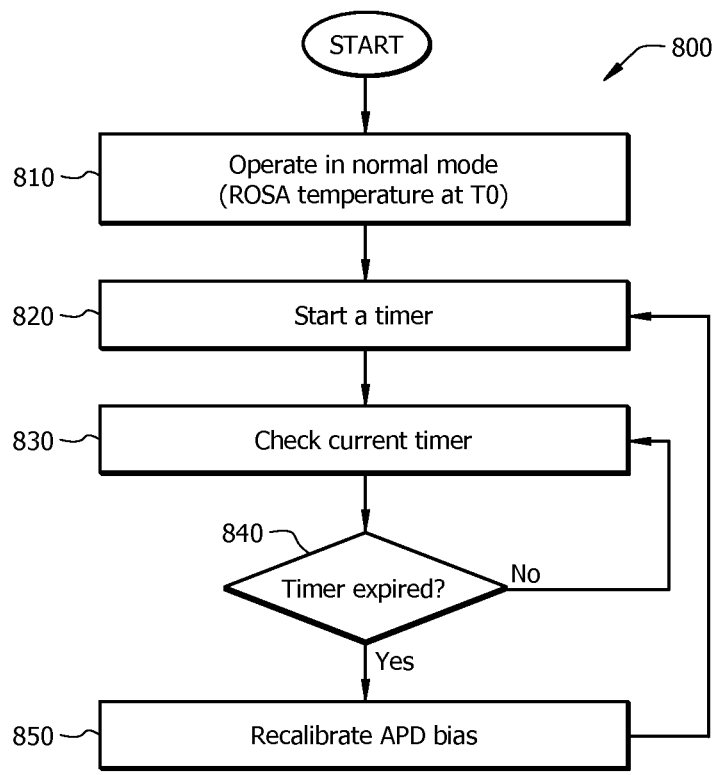
FIG. 8 is a flowchart of an embodiment of an automatic APD bias control method based on recalibration at fixed time intervals.

FIG. 8 is a flowchart of an alternative automatic APD bias control method 800, which may be implemented on an OLT 110. While method 800 is discussed with reference to an OLT, persons of ordinary skill in the art will appreciate that it could be applied to an ONU or other optical component. The method 800 may recalibrate the APD bias at fixed time intervals rather than based on temperature changes as in method 600. Since the temperature varies slowly at the central office, a fixed time interval of about 10 minutes may be sufficient. The method 800 may begin at step 810 where the OLT transceiver may have completed the APD bias calibration as discussed in method 500 and started normal operation. At this time, the APD ROSA temperature is at T0. At step 820, a timer with a fixed time interval may be started. As shown in the loop of steps 830 and 840, method 800 may continue to check the timer until the timer expires. Then, at step 850, the APD bias may be recalibrated according to method 700 as discussed above. The loop with steps 810 to 850 may be repeated during normal operation to recalibrate the APD bias for optimal sensitivity at fixed time intervals.

Figure 9:
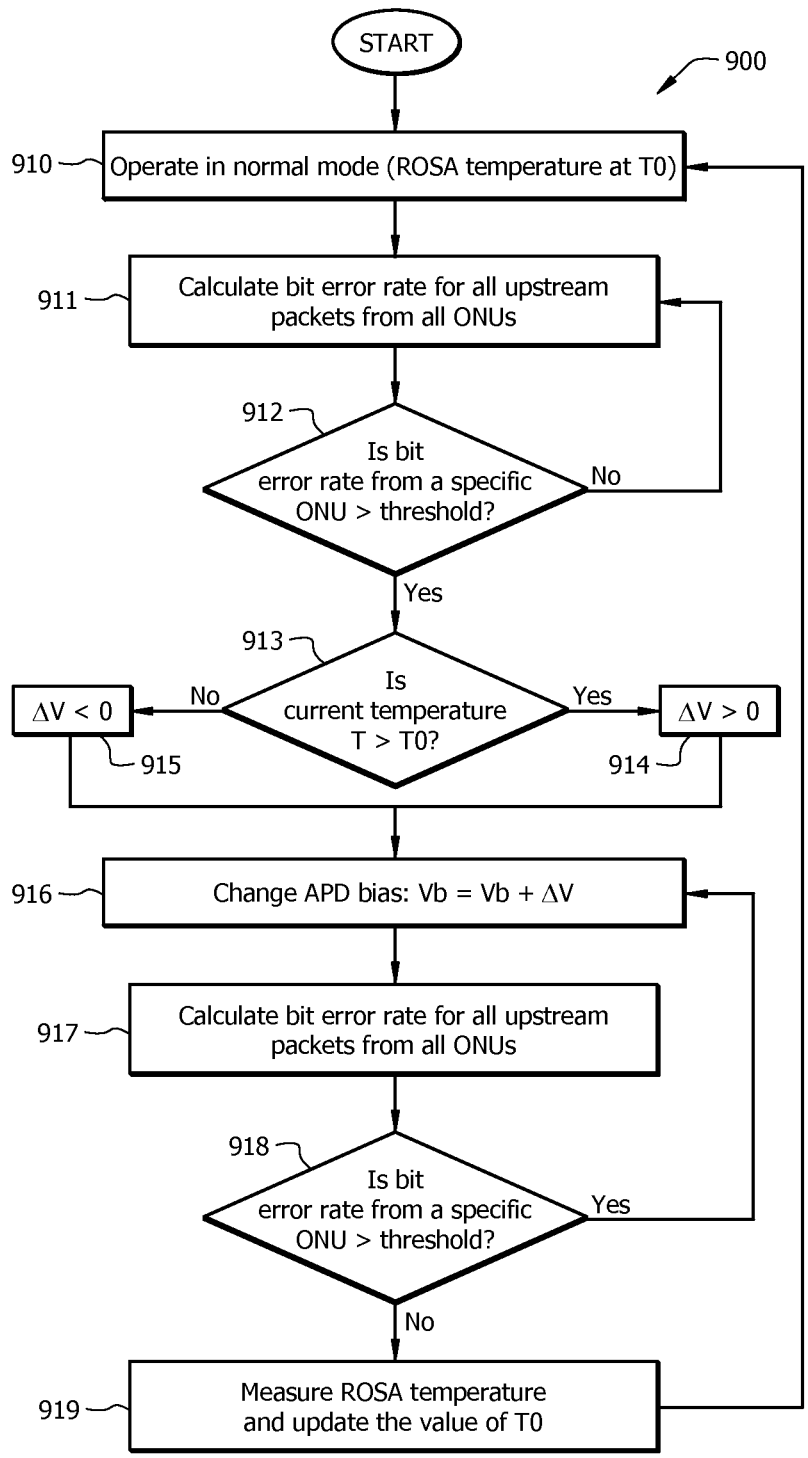
FIG. 9 is a flowchart of an embodiment of an APD bias recalibration method by monitoring upstream bit error rate change.

FIG. 9 is a flowchart of an alternative APD bias recalibration method 900, which may be implemented on an OLT 110, ONU 120, and/or any other optical component. The method 900 recalibrates the APD bias by monitoring upstream bit error rate measured with the FEC during normal operation without interrupting ONUs upstream transmissions. Therefore, method 900 may also be suitable for APD bias control at an ONU receiver. However, it should be noted that FEC may be required for XG-PON and 10 G EPON, but may be optional for GPON and EPON. The method 900 is explained in the context of an OLT herein, though an ONU or any other optical component may employ the same method. The method 900 may begin at step 910 where the OLT transceiver may have completed the APD bias calibration as discussed in method 500 and started normal operation. At this time, the APD ROSA temperature is at T0. At step 911, the bit error rate for all the upstream bursts may be calculated at the APD ROSA. As shown in the loop of steps 911 and 912, this may be continued until the upstream bit error rate from a specific ONU is above a certain threshold (e.g. about $10^{-4}$ before FEC) for a certain number of packets. Then, the method 900 may start APD bias adjustments. At steps 913 to 915, the small voltage step $\Delta V$ for APD bias adjustment may be set as an increment or decrement depending if the temperature has increased or decreased since last recalibration, similar to the steps 713 to 715 of method 700 as discussed above. As shown in the loop with steps 916 to 918, the APD bias adjustments may be continued until the upstream bit error rate from a specific ONU is less than a threshold (e.g. about $10^{-4}$ before FEC) for a certain number of packets. The APD bias voltage is then kept at that last setting. In the case when the upstream bit error rate cannot reach a smaller value than the threshold, the APD bias voltage may be adjusted until a substantially minimum bit error rate is achieved. At step 919, the APD ROSA temperature may be measured and value of T0 may be updated with the current temperature reading. The loop with steps 910 to 919 may be repeated during normal operation to maintain good receiver sensitivity as temperature varies. It should be noted that in the case where the increase in bit error rate is not caused by a temperature drift, the APD bias should not be recalibrated. Furthermore, the APD bias should never be increased more than the breakdown voltage of the APD.

Figure 10:
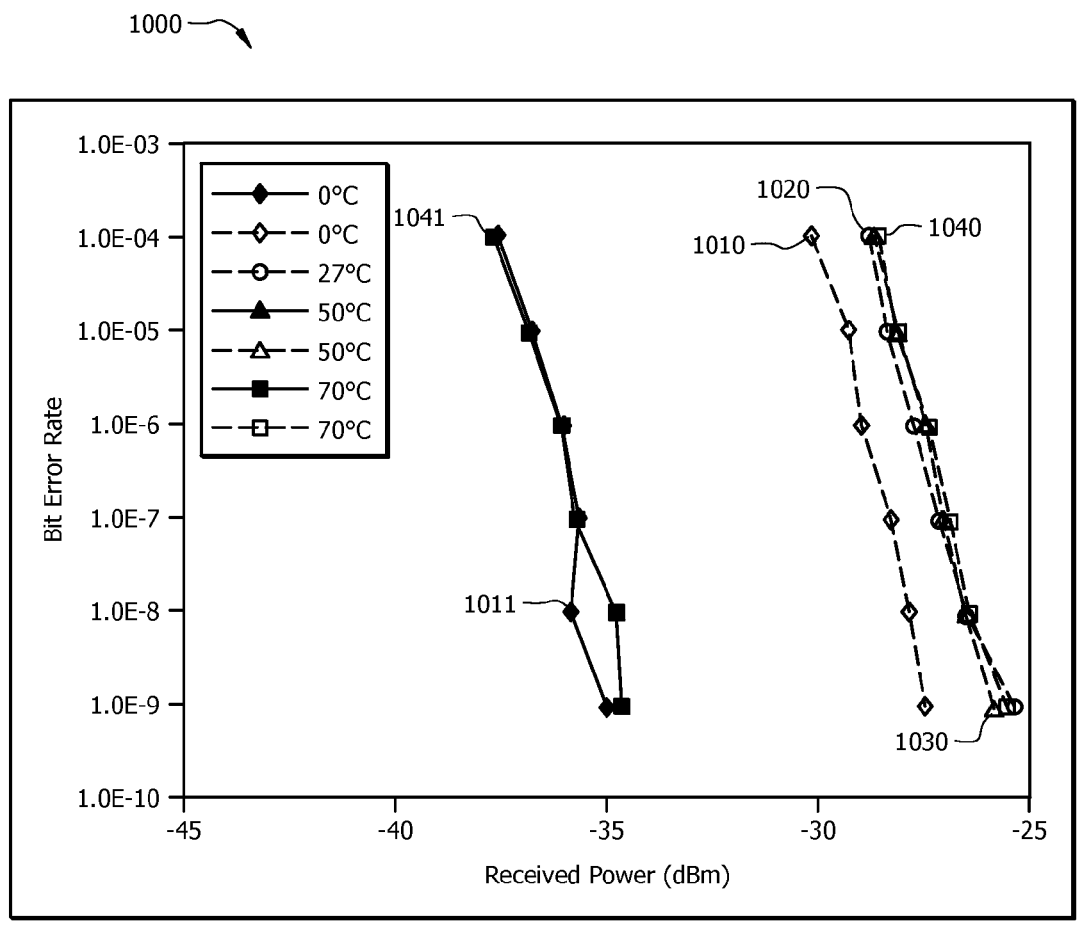
FIG. 10 is a graph of an embodiment of an APD receiver performance at an OLT.

FIG. 10 is a graph 1000 illustrating APD receiver performance improvements when APD bias control is applied at an OLT. The y-axis represents upstream bit error rate and the x-axis represents received power in dBm. In graph 1000, the bit error rate curves with opened symbols are measured without APD bias control, while the bit error rate curves with closed symbols are measured with APD bias control. The curves 1010, 1020, 1030 and 1040 are plots of upstream bit error rates without APD bias control as a function of received power at temperatures of about 0° C., about 23° C., about 50° C., and about 70° C., respectively. The curves 1011 and 1041 are plots of upstream bit error rates with APD bias control as a function of received power at temperatures of about 0° C. and about 70° C., respectively. By comparing curves 1010 and 1011, or curves 1040 and 1041, it is evident that the same upstream bit error rate can be achieved at a much lower received power for a given temperature when APD bias control is present. In other words, the receiver sensitivity is improved with APD bias control. It should be noted that the plots for upstream bit error rate with APD bias control at about 23° C. and about 50° C. are overlapped by the upstream bit error rate curve 1041 at about 70° C. in graph 1000. This also confirms that the optimal receiver sensitivity is achieved at any operating temperatures when automatic APD bias control is applied.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

What is claimed is:

1. An apparatus comprising:
   a receiver optical subassembly (ROSA) configured to receive an optical signal, wherein the ROSA comprises an optical-electrical (O/E) converter configured to convert the optical signal into an electrical signal; and
   a processor coupled to the ROSA and configured to:
      calibrate an O/E converter bias, wherein calibrating the O/E converter bias comprises:
         reading an initial O/E converter dark current measurement;
         adjusting the O/E converter bias with a voltage step;
         reading an adjusted O/E converter dark current measurement after the adjusting; and monitoring an initial O/E converter dark current change rate by subtracting the initial O/E converter dark current measurement from the adjusted O/E converter dark current measurement.

2. The apparatus of claim 1, wherein calibrating the O/E converter bias further comprises repeating the adjusting to generate an updated O/E converter dark current change rate until the updated O/E converter dark current change rate is about twice the initial O/E converter dark current change rate.

3. The apparatus of claim 1, wherein the voltage step is about 0.1 volt (V).

4. The apparatus of claim 1, wherein the processor is further configured to set an operating voltage for the O/E converter bias by subtracting a predefined voltage from the O/E converter bias, and wherein the operating voltage is an O/E converter bias while receiving data.

5. The apparatus of claim 4, wherein the predefined voltage is about 0.5 volt (V) or about 1 V.

6. The apparatus of claim 1, wherein the processor is further configured to bias the O/E converter with an initial voltage that is smaller than a breakdown voltage for the O/E converter and set the voltage step as an increment at a power up prior to the calibration.

7. The apparatus of claim 1, wherein the O/E converter is an avalanche photodiode (APD).

8. The apparatus of claim 1, wherein the processor is further configured to:
read an initial temperature of the ROSA after the calibration;
read an updated operating temperature of the ROSA prior to a new calibration;
set the voltage step as an increment when the updated operating temperature reading is higher than the initial temperature reading; and
set the voltage step as a decrement when the updated operating temperature reading is lower than the initial temperature reading.

9. An apparatus comprising:
a receiver optical subassembly (ROSA) configured to receive an optical signal, wherein the ROSA comprises an optical-electrical (O/E) converter configured to convert the optical signal into an electrical signal; and
a processor coupled to the ROSA and configured to:
calibrate an O/E converter bias, wherein calibrating the O/E converter bias comprises:
reading an initial O/E converter dark current measurement;
adjusting the O/E converter bias with a voltage step;
reading an adjusted O/E converter dark current measurement after the adjusting; and
monitoring an O/E converter dark current change rate by subtracting the initial O/E converter dark current measurement from the adjusted O/E converter dark current measurement,
wherein the apparatus is an Optical Line Terminal (OLT) and wherein the processor is further configured to:
monitor an operating temperature of the ROSA with a temperature sensor;
request a Media Access Control (MAC) for a new calibration when a change in the operating temperature exceeds a temperature threshold, wherein the temperature threshold is about ±5 degrees Celsius (C); and
send a request from the OLT to a plurality of Optical Network Units (ONUs) to stop upstream transmissions from the ONUs prior to the calibration.

10. The apparatus of claim 1, wherein the apparatus is an Optical Line Terminal (OLT) and wherein the processor is further configured to:
start a periodic timer with a fixed time interval, wherein the fixed time interval is about 10 minutes;
request a Media Access Control (MAC) for a new calibration when the periodic timer expires; and
send a request from the OLT to a plurality of Optical Network Units (ONUs) to stop upstream transmissions from the ONUs prior to the calibration.

11. The apparatus of claim 1, wherein the processor is further configured to initiate the calibrating when a bit error rate at the ROSA exceeds a threshold and continue the adjusting until the bit error rate is less than the threshold or is at a substantially minimum bit error rate when the bit error rate cannot be reduced below the threshold.

12. A computer program product comprising computer executable instructions stored on a non-transitory computer readable medium such that when executed by a processor cause an optical component to:
set an avalanche photodiode (APD) bias to an initial voltage, wherein the initial voltage is smaller than a breakdown voltage of the APD;
calibrate the APD bias, wherein calibrating the APD bias comprises:
reading an initial APD dark current measurement;
increasing the APD bias with voltage steps, wherein the voltage steps are about 0.1 Volt (V);
reading an updated APD dark current measurement after each voltage step;
monitoring an initial APD dark current change rate by subtracting the initial APD dark current measurement from the updated APD dark current measurement;
repeating the increasing to generate an updated APD dark current change rate until the updated APD dark current change rate is about twice the initial APD dark current change rate; and
setting an operating voltage for the APD bias by subtracting a predefined voltage from the APD bias, wherein the operating voltage is an APD bias while receiving data, and wherein the predefined voltage is about 0.5V or about 1V;
wait for a triggering event;
initiate a new calibration; and
repeat the wait for the triggering event and the initiation of the new calibration.

13. The computer program product of claim 12, wherein the instructions further cause the optical component to:
read an initial temperature of a receiver optical subassembly (ROSA) after the calibration;
read an updated operating temperature of the ROSA prior to the new calibration;
increase the APD bias with the voltage steps during the new calibration when the updated operating temperature is higher than the initial temperature; and
decrease the APD bias with the voltage steps during the new calibration when the updated operating temperature reading is lower than the initial temperature reading.

14. The computer program product of claim 12, wherein the optical component is an Optical Line Terminal (OLT), and wherein the instructions further cause the optical component to trigger the triggering event when an operating temperature at a receiver optical subassembly (ROSA) changes by about ±5 degrees Celsius and send a request from the OLT to a plurality of Optical Network Units (ONUs) to stop upstream transmissions from the ONUs prior to the calibration.

15. The computer program product of claim 12, wherein the optical component is an Optical Line Terminal (OLT), and wherein the instructions further cause the optical component to trigger the triggering event at a periodic interval of about 10 minutes at the OLT and send a request from the OLT to a plurality of Optical Network Units (ONUs) to stop upstream transmissions from the ONUs prior to the calibration.

16. The computer program product of claim 12, wherein the instructions further cause the optical component to:
  trigger the triggering event when a bit error rate at a receiver optical subassembly (ROSA) exceeds a first threshold, wherein the first threshold is about $10^{-4}$ for a ratio of number of bits error to total received bits;
  monitor the bit error rate; and
  stop the increasing when the bit error rate is below a second threshold, wherein the second threshold is about $10^{-4}$ for a ratio of number of bits error to total received bits or a substantially minimum value.

17. An avalanche photodiode (APD) bias calibration method comprising:
  biasing an APD to an initial voltage, wherein the initial voltage is smaller than a breakdown voltage of the APD;
  measuring an initial APD dark current measurement;
  increasing an APD bias with voltage steps, wherein the voltage steps are about 0.1 Volt (V);
  measuring an adjusted APD dark current after each voltage step;
  monitoring an initial APD dark current change rate by subtracting the initial APD dark current measurement from the adjusted APD dark current measurement;
  repeating the increasing to generate an updated APD dark current change rate until the updated APD dark current change rate is about twice the initial APD dark current change rate; and
  setting an operating voltage for the APD bias by subtracting a predefined voltage from the APD bias, wherein the operating voltage is an APD bias while receiving data and wherein the predefined voltage is about 0.5 volt (V) or about 1V.

18. The method of claim 17, further comprising:
  monitoring a change in an operating temperature with a temperature sensor at a receiver optical subassembly (ROSA);
  sending an APD bias calibration request to a Media Access Control (MAC) at an Optical Line Terminal (OLT) when the change exceeds a threshold, wherein the threshold is about ±5 degrees Celsius (C);
  sending a request from the OLT to a plurality of Optical Network Units (ONUs) to stop upstream transmissions from the ONUs prior to calibration;
  increasing the APD bias with the voltage steps when the change is an increment; and
  decreasing the APD bias with the voltage steps when the change is a decrement.

19. The method of claim 17, further comprising:
  reading an initial temperature of a receiver optical subassembly (ROSA);
  sending an APD bias calibration request to a Media Access Control (MAC) at an Optical Line Terminal (OLT) at a periodic time interval, wherein the periodic time interval is about 10 minutes;
  sending a request from the OLT to a plurality of Optical Network Units (ONUs) to stop upstream transmissions from the ONUs prior to calibration;
  reading an updated operating temperature of the ROSA;
  increasing the APD bias with the voltage steps when the updated operating temperature is higher than the initial temperature; and
  decreasing the APD bias with the voltage steps when the updated operating temperature is lower than the initial temperature.

20. The method of claim 17, further comprising:
  reading an initial temperature of a receiver optical subassembly (ROSA);
  monitoring a bit error rate at the ROSA;
  initiating an APD bias calibration when the bit error rate exceeds a first threshold, wherein the first threshold is about $10^{-4}$ for a ratio of number of bits error to total received bits;
  reading an updated operating temperature of the ROSA;
  increasing the APD bias with the voltage steps when the updated operating temperature is higher than the initial temperature;
  decreasing the APD bias with the voltage steps when the updated operating temperature is lower than the initial temperature; and
  stopping the increasing or the decreasing when the bit error rate is below a second threshold, wherein the second threshold is about $10^{-4}$ for a ratio of number of bits error to total received bits or a substantially minimum value.

* * * * *